United States Patent
Hemsath

(10) Patent No.: US 7,293,533 B2
(45) Date of Patent: Nov. 13, 2007

(54) RECUPERATIVE REFORMING REACTOR

(75) Inventor: Klaus Heinrich Hemsath, Palmetto, FL (US)

(73) Assignee: Utilization Technology Development, NFP, Des Plaines, IL (US)

( * ) Notice: Subject to any disclaimer, the term of this patent is extended or adjusted under 35 U.S.C. 154(b) by 110 days.

(21) Appl. No.: 11/199,349

(22) Filed: Aug. 8, 2005

(65) Prior Publication Data

US 2007/0028860 A1    Feb. 8, 2007

(51) Int. Cl.
*F02B 43/08* (2006.01)
(52) U.S. Cl. ............................................. 123/2; 123/3
(58) Field of Classification Search ............... 123/3, 123/557, 2
See application file for complete search history.

(56) References Cited

U.S. PATENT DOCUMENTS

| | | | |
|---|---|---|---|
| 5,011,625 A | 4/1991 | Le Blanc | |
| 6,223,519 B1 | 5/2001 | Basu et al. | |
| 6,463,889 B2 * | 10/2002 | Reddy | 123/3 |
| 6,508,209 B1 | 1/2003 | Collier, Jr. | |
| 6,855,272 B2 | 2/2005 | Burlingame et al. | |
| 2005/0279333 A1 | 12/2005 | Kweon et al. | |

* cited by examiner

*Primary Examiner*—Stephen K. Cronin
*Assistant Examiner*—Hyder Ali
(74) *Attorney, Agent, or Firm*—Mark E. Fejer

(57) ABSTRACT

A method and apparatus for fuel reforming using the exhaust gases from internal combustion engines and high temperature combustion processes in which a fuel for reforming and steam mixture is introduced into a tube bundle having a plurality of heat exchange tubes and heat from the exhaust gases is transferred into the heat exchange tubes, thereby increasing the temperature of the mixture. The heated mixture is reformed by contact with a reforming catalyst external to, but proximate to the exit of, the tube bundle, forming a reformed fuel. To remove substantially all of the heat from the exhaust gases, a plurality of tube bundles and associated reforming catalyst arranged in series are provided.

9 Claims, 5 Drawing Sheets

RECUPERATIVE REFORMING REACTOR

BACKGROUND OF THE INVENTION

1. Field of the Invention

This invention relates to a method and apparatus for reforming hydrocarbon fuels to produce hydrogen in which extracted waste heat from internal combustion engines, furnace exhaust gases and the like at temperatures of about 1500° F. and lower and pressures ranging from a few inches of water column above atmospheric to about 10 bar is utilized to increase the temperature of a gaseous or liquid fuel, in a mixture with steam, to a level where the heated mixture will begin to react in the presence of a reforming catalyst and consume the extracted waste heat until the temperature of the catalyzed reactants becomes so low that the reaction virtually ceases. This invention may also be applied to other homogeneous or heterogeneous reactions where large amounts of reaction heats are either consumed or liberated. Without intending in any way to limit the scope of this invention, the invention as described herein is based upon the example of a catalyzed reaction with strong endothermic heat consumption.

2. Description of Related Art

Thermal processes often reject large amounts of heat. The percentage of rejected or waste heat is particularly large in processes in which chemical energy or fuel value is converted into mechanical energy. Exemplary of such processes are engines. Reciprocating internal combustion engines have thermal efficiencies in the range of about 25 to 40% depending upon design and age of the engine. Diesel engines typically have higher efficiencies than gasoline engines. A typical, modem diesel engine may have a mechanical efficiency of about 35%. Thus, depending upon the type of engine employed, up to about 75% of the fuel value consumed by these engines is converted into waste heat. Since the invention of these engines, efforts have been ongoing to increase their mechanical efficiency; and as fuel costs increase, these efforts become more urgent.

One approach for utilizing part of the waste heat generated by reciprocating internal combustion engines is thermochemical recuperation or TCR. In this process, a portion of the waste heat is recirculated into the engine. A method commonly employed in boilers and other heating devices, namely preheating of combustion air by exchanging heat in a heat exchanger, is not readily applicable to engines because the mass of preheated air or gas aspirated by the engine will be much smaller and will lead to performance derating. In addition, engine cooling will become more complex.

Reforming of fuels with steam is an established art. In this process, a gaseous or liquid fuel such as natural gas or methanol is reacted at high temperatures, greater than about 1500° F., to produce hydrogen, carbon monoxide, and carbon dioxide. The use of such high temperatures permits the use of thermal radiation both outside the reformer reactor tubes and, more importantly, inside the reactor tubes. However, when dealing with lower temperatures, such as are encountered with exhaust gases from engines and many furnace applications, heat transfer mechanisms change drastically from those at higher temperatures, especially those occurring in packed catalyst beds with strongly endothermic reactions.

The reforming reaction can follow different paths based on process conditions and will, accordingly, produce a variety of reaction end products. When producing large percentages of hydrogen and carbon monoxide, the reaction is endothermic; that is, the reaction consumes heat. In the reforming reaction, the consumed, sensible heat is converted into fuel with a higher heating value. Thus, comparatively low-cost waste heat is converted into a higher heating value fuel.

U.S. Pat. No. 6,855,272 B2 to Burlingame et al. teaches a syngas production process and reforming exchanger in which a first portion of hydrocarbon feed mixed with steam and oxidant is passed through an autothermal catalytic steam reforming zone to form a first reformed gas of reduced hydrocarbon content, a second portion of the hydrocarbon feed mixed with steam is passed through an endothermic catalytic steam reforming zone to form a second reformed gas of reduced hydrocarbon content, and the first and second portions of reformed gases are mixed, forming a gas mixture which is passed through a heat exchange zone for cooling the gas mixture and, thereby, providing heat to the endothermic catalytic steam reforming zone. The endothermic catalytic steam reforming zone and the heat exchange zone are respectively disposed tube side and shell side within a shell-and-tube reforming exchanger, which comprises a plurality of tubes packed with low pressure drop catalyst-bearing monolithic structures.

The reforming of fuels with steam is readily applicable to reciprocating, internal combustion engines, gas turbines, and furnaces. Utilization of the waste heat from an internal combustion engine for reforming of fuels is taught, for example, by U.S. Pat. No. 6,508,209 B1 to Collier, Jr. in which natural gas and/or propane is introduced into a reforming reactor for the purpose of converting or reforming a portion thereof to hydrogen and carbon monoxide, providing a gaseous mixture exiting the reactor comprising methane and/or propane, hydrogen, steam, nitrogen, carbon monoxide, and carbon dioxide. The gaseous mixture is mixed with air to provide a gaseous fuel mixture and air combination which is introduced into the internal combustion engine and combusted to produce an exhaust gas. A portion of the exhaust gas is recycled and introduced into the reforming reactor for the purpose of reforming a portion of the gaseous fuel to hydrogen and carbon monoxide. In accordance with one embodiment, the exhaust gas is used, without diluting the combustion charge, for preheating the fuel to be reformed, as well as the catalyst bed, for purposes of reforming the fuel.

However, despite its apparent attractiveness, this method has not found widespread use due to a number of technical problems. These problems must be resolved before this method can be effectively applied to reciprocating, internal combustion engines, gas turbines and furnaces. For one thing, the amount of heat that can be saved is very much a function of exhaust gas temperature. The higher the exhaust gas temperature is and the lower the temperature of the discharged, cooled exhaust gas is, the more waste heat that can be recovered. On the other hand, elevated temperatures are required to initiate the reforming reactions. These reforming reactions are strongly temperature dependent. When the hot mixture of fuel and steam contacts a suitable reforming catalyst, the reforming reactions will be initiated. However, they will extinguish themselves quickly if no heat is supplied to keep the reaction temperatures at a high enough level to maintain the reforming reactions.

SUMMARY OF THE INVENTION

It is one object of this invention to provide a method and apparatus for reforming hydrocarbon fuels to produce hydrogen gas.

It is one object of this invention to provide a method and apparatus for recovering the waste heat generated by internal combustion engines and fossil fuel fired furnaces.

It is another object of this invention to provide a method and apparatus for reforming hydrocarbon fuels utilizing the waste heat in the exhaust gases from internal combustion engines and fossil fuel fired furnaces.

It is another object of this invention to provide a method and apparatus for reforming hydrocarbon fuels into fuels with a higher heating value utilizing the sensible waste heat in the exhaust gases from internal combustion engines and fossil fuel fired furnaces.

It is another object of this invention to provide a method and apparatus for reforming hydrocarbon fuels at process temperatures in the range of about 500° F. to about 1500° F.

It is yet another object of this invention to provide a method and apparatus for reforming hydrocarbon fuels at process pressures ranging from a few inches of water column above atmospheric to about 10 bar.

These and other objects of this invention are addressed by a method and apparatus for fuel reforming in which a fuel for reforming is introduced into a tube bundle comprising a plurality of heat exchange tubes. A hot heat exchange fluid is introduced into a housing disposed around the tube bundle whereby the hot heat exchange fluid contacts the outer surfaces of the plurality of tubes, forming a heated fuel for reforming inside the plurality of heat exchange tubes and cooling the hot heat exchange fluid, forming a cooler heat exchange fluid. The heated fuel for reforming is reformed by contact with a reforming catalyst disposed external to the tube bundle proximate a heated fuel outlet of the plurality of heat exchange tubes, forming a gaseous mixture comprising a reformed fuel. The reformed fuel is recovered from the gaseous mixture and the cooler heat exchange fluid is exhausted from the housing.

Thus, the method and apparatus of this invention not only facilitate the catalyzed reforming reaction, but also continually provide the critically required heat into the reaction. In addition, in one single vessel having heat exchange means and reaction promoting means, the reactions can be made to continue and proceed until the recoverable amount of heat in the heat exchange fluid has been converted virtually completely into a virgin fuel (reformate fuel) in the form of a mixture of hydrogen and carbon monoxide. That is to say, a substantial portion of the heat, which in accordance with preferred embodiments of this invention is derived from the high temperature exhaust gases of internal combustion engines and industrial furnaces, is removed and converted by thermo-chemical means into high value fuel having a higher heating value than the initial hydrocarbon fuel. This high value fuel can then be injected, as a separate stream or together with the primary engine or furnace fuel into the same internal combustion engine or industrial furnace, respectively, that discharges the high temperature exhaust gases, or into another engine or industrial furnace. After injection or aspiration, the engine will readily combust this fuel. In fact, the high hydrogen content of the injected/aspirated fuel modifies the combustion process such that, in addition to a reduction in fuel consumption, the engine will exhibit better operational features such as more reliable ignition. In addition, experience has shown that combustion generated pollutants are substantially reduced compared to the combustion generated pollutants from conventionally operated engines.

A reduction in fuel consumption as may occur with the method and apparatus of this invention compared to conventional engines has several benefits. For example, operating costs relating to fuel costs are reduced while engine power output and performance remain unchanged. In addition, the method and apparatus of this invention offer the possibility of substantial additional benefits. In particular, if the same amount of power can be produced with substantially less fuel, it will be apparent that engine efficiency has increased. Thus, by adding the apparatus of this invention to an engine, it now seems possible to build a diesel engine that can break the 50% efficiency barrier.

The injection of hydrogen into the combustion reaction also has other benefits. It is theoretically and practically possible to completely burn all fuel injected into the engine. Exhaust gases from high temperature combustion processes using hydrogen as part of the fuel mixture virtually do not contain any other emissions than nitrogen, water vapor, and carbon dioxide.

BRIEF DESCRIPTION OF THE DRAWINGS

These and other objects and features of this invention will be better understood from the following detailed description taken in conjunction with the drawings wherein.

DETAILED DESCRIPTION OF THE PRESENTLY PREFERRED EMBODIMENTS

Figure 1:
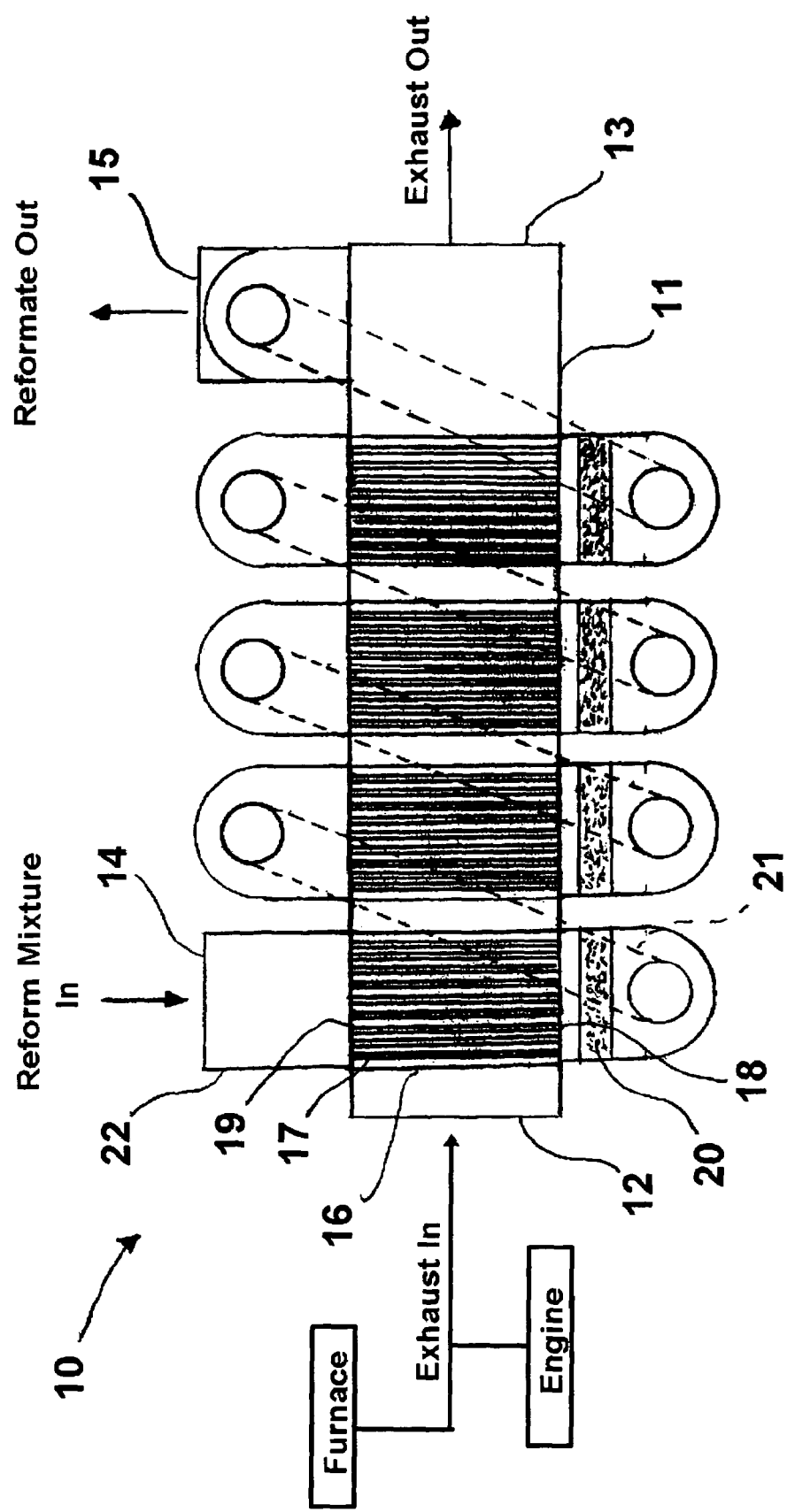
FIG. 1 is a schematic diagram of a recuperative reforming reactor in accordance with one embodiment of this invention.
Figure 2:
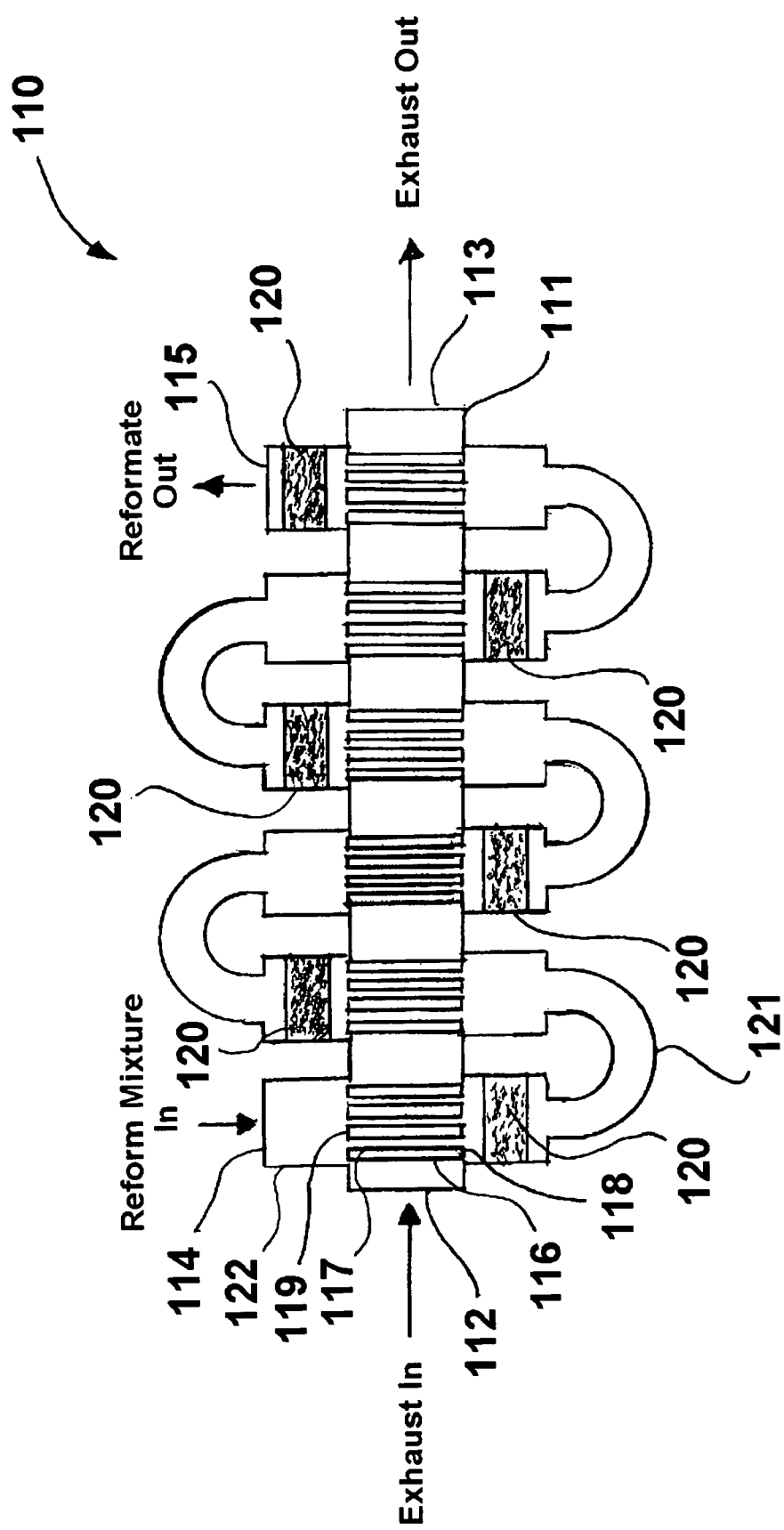
FIG. 2 is a schematic diagram of a recuperative reforming reactor in accordance with another embodiment of this invention.

Recuperative reforming reactors in accordance with two embodiments of this invention are shown in FIGS. 1 and 2. Recuperative reforming reactor 10, 110 as shown in FIGS. 1 and 2 comprises a reforming conduit 22, 122 having a reformable fuel inlet end 14, 114 and a reformed fuel outlet end 15, 115. Reforming conduit 22, 122 comprises at least one tube bundle 16, 116 comprising a plurality of heat exchange tubes 17, 117, the tube bundle having a tube bundle inlet end 19, 119 having a reformable fuel inlet and a tube bundle outlet end 18, 118 having a reformable fuel outlet. A housing 11, 111 having a heat exchange fluid inlet 12, 112 and a heat exchange fluid outlet 13, 113 is disposed around the at least one tube bundle 16, 116 to provide a crossflow configuration of heat exchange fluid flow relative to the plurality of heat exchange tubes 17, 117 through the housing. It is to be understood that other configurations of heat exchange fluid flow relative to the plurality of heat exchange tubes 17, 117, such as co-flow or counterflow with respect to the direction of fluid flow within the heat exchange tubes, are also possible and such configurations are deemed to be within the scope of this invention. A reforming catalyst 20, 120 is disposed within reforming conduit 22, 122 proximate the tube bundle outlet end 18, 118 of tube bundle 16, 116, external to, and downstream of, the tube bundle 16, 116. Any reforming catalyst known to those skilled in the art may be employed. Typically, such catalysts comprise metals or metal oxides disposed on a substrate material. Exemplary of such catalysts are oxides of nickel, copper, zinc, and chromium.

There is a substantial disparity between the internal cross sections of the heat exchange tubes compared to the free cross-section bounded by the external tube diameters in the tube bundle. This is caused by the combined effects of mass flow ratio of external to internal flows and by the high pressures on the inside of tubes. In addition, the passages on the outside of the tubes must be kept large to reduce the pressure drop incurred by the exhaust gases inside the housing. Very small internal tube diameters are preferred. Small diameter tubes have higher strength and provide superior heat transfer conditions. In accordance with one preferred embodiment of this invention, tube diameters are equal to or less than about 1.5 inches. The preferred length to diameter ratio of the tubes ($L/D_{tube}$) is less than about 300.

In accordance with one embodiment of the method of this invention, heated exhaust gases from an internal combustion engine or high temperature combustion process, e.g. industrial heating furnace, are introduced through the heat exchange fluid inlet 12, 112 into the housing 11, 111. Steam and a reformable fuel (reform mixture) are introduced into reform fuel inlet 14, 114 of reformer conduit 22, 122. The steam and reformable fuel mixture passes through a tube bundle 16, 116 comprising a plurality of heat exchange tubes 17, 117 disposed within the housing 11, 111. The heated exhaust gases contact the heat exchange tubes in a crossflow configuration, resulting in heating of the steam and reformable fuel mixture and cooling of the heated exhaust gases. The heated steam and reformable fuel mixture is then passed through a reforming catalyst bed 20, 120 disposed proximate to the tube bundle outlet end 18, 118 and external to the tube bundle, resulting in reforming of at least a portion of the reformable fuel, forming a reformate mixture comprising a reformed fuel and possibly an unreacted portion of reform mixture, and cooling of the reform mixture and the reforming catalyst in the endothermic reforming reaction. The reforming reactions take place in the catalyst bed as long as the catalyst temperature is high enough and as long as unreacted reform mixture is still present. On its passage through the catalyst bed, the reform mixture converts sensible heat into chemical energy, forming the reformate, which conversion continues until the temperature has cooled too far and the reactions have become sluggish. No catalyst is disposed within the tubes of the tube bundle. When the reforming reactions are slowed, they can be rekindled by increasing the temperature of the unreacted reform mixture. In accordance with one embodiment of this invention, the reform mixture exiting from the catalyst bed is communicated by means of duct 21, 121 to the tube bundle inlet end of a downstream tube bundle also having a reforming catalyst disposed proximate to the tube bundle outlet end and external to the tube bundle whereby the processes of heat transfer and fuel reforming are repeated. Thus, as the unreacted reform mixture passes through the second tube bundle, it is heated by heat exchange with the heat exchange fluids flowing around the second tube bundle. The reform mixture temperature increases until it is discharged into the second catalyst bed disposed at the exit of the second tube bundle where sensible heat therein is converted and where the reform mixture is again cooled down. This cycle may be repeated in successive, serially configured tube bundles until the available waste heat in the heat exchange fluid has been substantially depleted.

In accordance with one embodiment of this invention, the reform mixture employed in the method of this invention comprises natural gas and steam; in accordance with another embodiment of this invention, the reform mixture comprises methane and steam; and, in accordance with yet another embodiment of this invention, the reform mixture comprises recirculated exhaust gases and natural gas.

Figure 3:
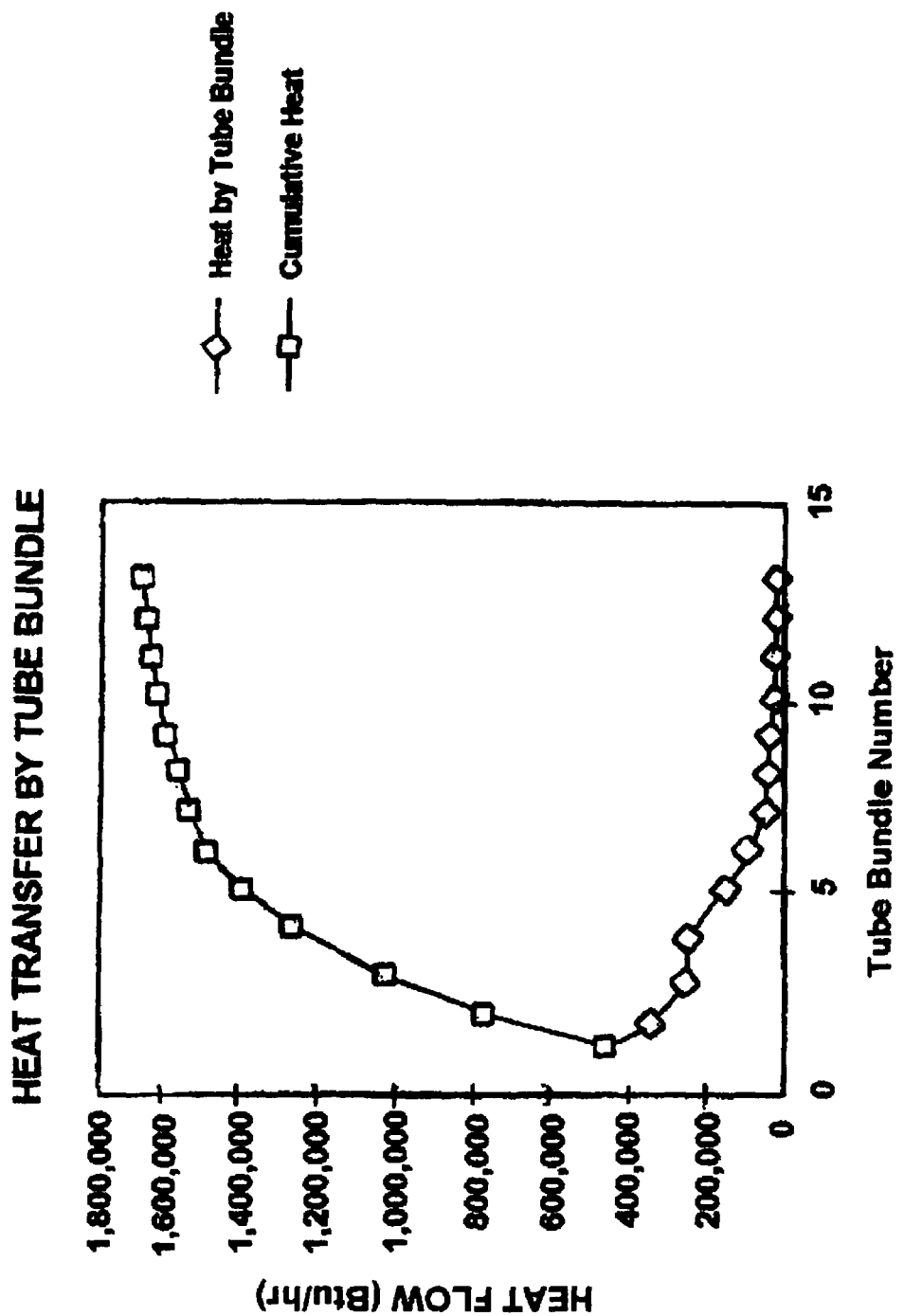
FIG. 3 is a diagram showing the heat transfer characteristics of the tube bundles comprising the recuperative reforming reactor in accordance with one embodiment of this invention.
Figure 4:
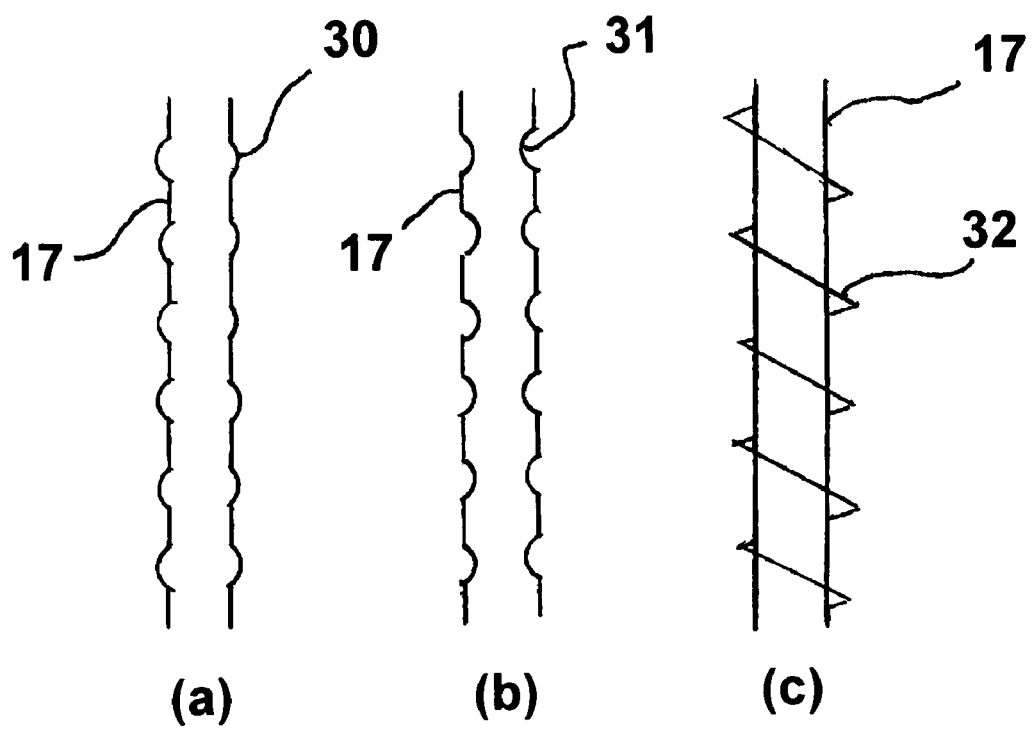
FIG. 4(a)–(d) shows various heat transfer enhancements suitable for use in the recuperative reforming reactor of this invention.
Figure 4:
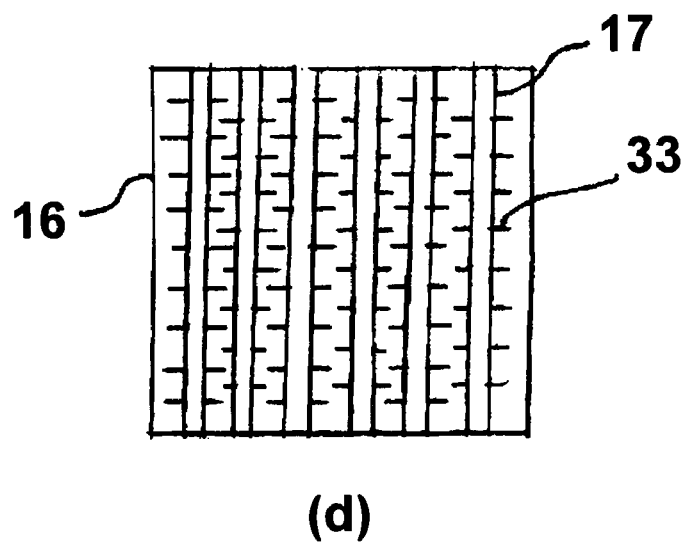

It will be apparent to those skilled in the art that the number of successive catalyst beds required for substantially complete conversion of the reform mixture will vary depending on the dimensional parameters and configurations of the components comprising the recuperative reforming reactor and on the properties of the reform mixture and the exhaust gases. Although shown in FIGS. 1 and 2 as being substantially equal in size, the size, as well as shape, of the catalyst beds at the outlet of each tube bundle may vary. FIG. 3 shows the decreasing contributions that the catalyst beds can make despite their identical heat transfer surface areas. The principal reason for this decrease is successive lowering of the temperatures of the heat exchange gases as they flow through successive tube bundles.

In accordance with one embodiment of this invention, the heat exchange fluid inlet 12, 112 of housing 11, 111 is disposed proximate the reform fuel inlet 14, 114 and the direction of flow of the heat exchange fluid is towards the reformed fuel outlet end 15, 115 of reforming conduit 22, 122. In accordance with an alternative embodiment of this invention, the heat exchange fluid inlet is disposed proximate the reformed fuel outlet end of the reforming conduit and the direction of flow of the heat exchange fluid is from the reformed fuel outlet end to the reform fuel inlet end of the reforming conduit. Other potential configurations for the recuperative reforming reactor of this invention are also possible.

The basic task of the reactor is to transfer the sensible heat contained in the heat exchange fluid to the reform mixture for which there are two basic approaches. The first approach is catalytic reactors that combine heat transfer and catalytic reactions in intimate proximity, that is where the catalyst is disposed in the heat exchange tubes of the tube bundle. The tubes are heated from the outside by radiation and convection and the heat is then conducted into the catalyst disposed within the tubes. The heat is transferred from the tube walls to the catalyst and the reform mixture. When the temperatures are high enough, the reforming reactions take place. However, this configuration does not work particularly well when the reaction is strongly endothermic and when the catalyst temperatures are comparatively low. This configuration loses its effectiveness altogether when the catalyst consists of many catalyst pellets or grains or fragments and when the radiation effects of heat transfer at high temperatures become insignificant. Under such small particulate, low reform mixture temperature conditions, the apparent thermal conductivity of the internal catalyst bed rapidly deteriorates, making such configurations very ineffective.

Packed beds are notorious for having low thermal conductivities. At higher bed temperatures, the conditions are more favorable because the apparent thermal conductivity of a bed increases due to the contribution of radiative heat transfer.

Alternatively, the catalyst may be deposited directly on the tube, in which case one side of the tube does double duty, transmitting heat to the reform mixture and simultaneously promoting the reforming reactions. However, most commercially available steam reforming catalysts are deposited on ceramic substrates and ceramic materials are generally not suitable for tube fabrication.

Catalyst beds are, thus, the preferred configuration of conventional, commercial catalysts. In accordance with one embodiment of this invention, the catalyst bed is a fluidized bed in which the catalyzed reactions are carried out. In accordance with another embodiment of this invention, the reforming catalyst is disposed in a recirculating catalyst bed.

As previously indicated, heat transfer from the heat exchange fluid to the tube bundles occurs through both radiative and convective means. In accordance with one embodiment of this invention, the convective heat transfer is enhanced by the presence of small surfaces that are placed parallel to the heat exchange fluid flow through the tube bundle, by the optimization of dimensions with respect to tube spacing, and by arrangement of the tubes in the tube bundle in a staggered pattern. In accordance with one embodiment of this invention, as shown in FIG. 4(a)–(d), convective heat transfer to the tube bundle is enhanced by such means as dimples 31 and pimples 30 on the outside and inside of the tubes, by helical wires 32 disposed inside and/or outside the tubes, and by fins 33 disposed within the tube bundle external to the tubes.

Figure 7:
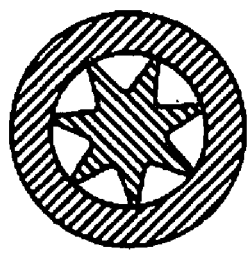
FIG. 7 shows a transverse cross-sectional view of a tube insert for providing the combined functions of heat transfer enhancement, heat transfer area enlargement, and catalytic reaction acceleration in accordance with yet another embodiment of this invention.
Figure 6:
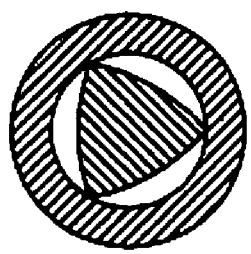
FIG. 6 shows a transverse cross-sectional view of a tube insert for providing the combined functions of heat transfer enhancement, heat transfer area enlargement, and catalytic reaction acceleration in accordance with another embodiment of this invention.
Figure 5:
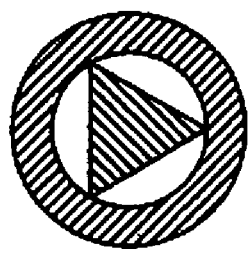
FIG. 5 shows a transverse cross-sectional view of a tube insert for providing the combined functions of heat transfer enhancement, heat transfer area enlargement, and catalytic reaction acceleration in accordance with one embodiment of this invention.

In accordance with one embodiment of this invention, an elongated solid bar or rod is disposed within at least a portion of the plurality of heat exchange tubes. By inserting such a solid displacement volume on the inside of the tubes, another heat transfer enhancing measure is achieved. By restricting the open cross-section of the tube, both the inside and outside diameters of the tubes can be increased, not only generating higher heat transfer rates, but also increasing the available heat transfer surface without deleterious effects on heat transfer rates. In accordance with one embodiment of this invention, the elongated solid rods comprise at least one reforming catalyst. In addition to the simplification of equipment design and reduction of equipment size, these solid, catalyst covered inserts provide additional benefits. The inside heat transfer is substantially increased due to higher flow velocities and significantly larger Nusselt numbers. Characteristic flow dimensions are reduced, resulting in increased mass and heat transfer rates. The increased pressure drops that occur with the insertion of the elongated solid rods can be tolerated on the inside of the tubes when a mixture of fuel and steam is being employed. Indeed, on the inside of the tube, much larger pressure drops can be tolerated than on the outside of the tube. By selecting the proper shapes, the inert tube diameter can be increased as previously indicated while simultaneously either increasing or maintaining pressure drops on the inside of the tube. This results in an increase in the outer tube diameter without incurring a large pressure drop on the outside (or inside) of the tube. Tubes with differently shaped elongated inserts are shown in FIGS. 5, 6, and 7. The simplest shape is the triangle. By shaping the sides of the triangle with either concave or convex lines, the flow velocity and the Nusselt number can be adjusted at will over a wide range. The star-shaped insert shows another approach to creating a large surface area and increasing reaction surface and volumetric reaction rates. The combined effects of rate enhancement and surface increase are multiplicative. The resulting effects are major. Because the cost of the inserted displacement bodies can be kept very low, for example, by use of extruded and fired ceramic materials, major heat transfer rate increases that cost very little to implement are achieved. In addition, enhancement approaches, such as dimples, protrusions, fins, vanes and the like can be readily impressed on these displacement bodies without a discernible increase in costs.

When used in combination with an internal combustion engine, the recuperative reforming reactor of this invention addresses the following problems. First, the exhaust gas from the engine can be delivered from the engine at low overall pressures. Second, low exhaust gas pressure drops may produce low exhaust gas heat transfer rates, which is addressed by the use of heat transfer enhancements for convective and radiative heat transfer on the exhaust gas side of the tube bundles. Third, smaller diameter tubes create large Nusselt numbers, provide increased strength at elevated temperatures, allow the use of less costly heat resistant alloys, and are easily fabricated into tube bundles. Fourth, the reform mixture can be easily delivered at very high pressures, providing increased heat transfer inside the tubes, increased reaction rates in the catalyst beds, and facilitation of modified combustion processes in engines.

While in the foregoing specification this invention has been described in relation to certain preferred embodiments thereof, and many details have been set forth for the purpose of illustration, it will be apparent to those skilled in the art that the invention is susceptible to additional embodiments and that certain of the details described herein can be varied considerably without departing from the basic principles of this invention.

What is claimed is:

1. An apparatus for fuel reforming comprising:
   reforming means for reforming a reformable fuel, said reforming means having a reformable fuel inlet and a reformed fuel outlet;
   heat exchange means for heating said reformable fuel in said reforming means, said heat exchange means in convective heat exchange communication with said reforming means and having a heated heat exchange fluid inlet and a cooled heat exchange fluid outlet;
   a heat exchange fluid source selected from the group consisting of an internal combustion engine, a combustor and combinations thereof, said heat exchange fluid source having a heated heat exchange fluid outlet in fluid communication with said heated heat exchange fluid inlet of said heat exchange means; and
   said reforming means comprising at least one tube bundle comprising a plurality of heat exchange tubes having a reformable fuel tube inlet in fluid communication with said reformable fuel inlet and a fuel outlet in fluid communication with said reformed fuel outlet, and at least one reforming catalyst, said at least one reforming catalyst disposed external to said tube bundle proximate said fuel outlet.

2. An apparatus in accordance with claim 1, wherein said heated heat exchange fluid outlet of said internal combustion engine is in fluid communication with said reformable fuel inlet of said reforming means.

3. An apparatus in accordance with claim 1 comprising a plurality of serially configured said tube bundles, wherein said fuel outlet of an upstream said tube bundle is in fluid communication with said reformable fuel inlet of a downstream said tube bundle.

4. An apparatus in accordance with claim 1, wherein said plurality of tubes comprise at least one convection heat transfer enhancement.

5. An apparatus in accordance with claim 4, wherein said at least one convective heat transfer enhancement is selected from the group consisting of dimples, bumps, and combinations thereof disposed on at least one surface of said plurality of heat exchange tubes.

6. An apparatus in accordance with claim 4, wherein said at least one heat transfer enhancement comprises at least one helical coil disposed at least one of internal and external to said plurality of heat exchange tubes.

7. An apparatus in accordance with claim 4, wherein said at least one convective heat transfer enhancement comprises at least one heat exchange fin disposed in said at least one tube bundle external to said plurality of heat exchange tubes.

8. An apparatus in accordance with claim 1 further comprising an elongated solid tube insert disposed within at least a portion of said plurality of heat exchange tubes.

9. An apparatus in accordance with claim 8, wherein said elongated solid tube insert comprises said at least one reforming catalyst.

* * * * *